United States Patent
Watanabe (10) Patent No.: US 9,488,226 B2
(45) Date of Patent: Nov. 8, 2016

(54) ROLLING BEARING APPARATUS AND LUBRICATION UNIT

(71) Applicant: JTEKT CORPORATION, Osaka-shi, Osaka (JP)

(72) Inventor: Hajime Watanabe, Kashiwara (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/801,645

(22) Filed: Jul. 16, 2015

(65) Prior Publication Data

US 2016/0025138 A1 Jan. 28, 2016

(30) Foreign Application Priority Data

Jul. 23, 2014 (JP) ................. 2014-149663

(51) Int. Cl.
| | | |
|---|---|---|
| F16C 19/04 | (2006.01) | |
| F16C 33/66 | (2006.01) | |
| F16C 19/06 | (2006.01) | |
| F16C 19/16 | (2006.01) | |

(52) U.S. Cl.
CPC ....... *F16C 33/6655* (2013.01); *F16C 33/6659* (2013.01); *F16C 19/06* (2013.01); *F16C 19/163* (2013.01); *F16C 2202/36* (2013.01); *F16C 2240/94* (2013.01); *F16C 2322/39* (2013.01)

(58) Field of Classification Search
CPC ............ F16C 33/1045; F16C 33/6651; F16C 33/6655; F16C 33/6659; F16C 33/6677; F16C 2202/36

USPC .................................................. 384/462, 473
See application file for complete search history.

(56) References Cited

U.S. PATENT DOCUMENTS

| | | | |
|---|---|---|---|
| 8,403,110 B2 * | 3/2013 | Suzuki ................ | B23Q 11/123 184/6.26 |
| 2005/0140796 A1 * | 6/2005 | Okabe ..................... | H04N 1/40 348/231.99 |
| 2006/0165328 A1 | 7/2006 | Ueno et al. | |
| 2007/0071382 A1 * | 3/2007 | Suzuki ................ | F16C 33/6674 384/462 |
| 2014/0248015 A1 * | 9/2014 | Yamamoto ............ | F16C 33/664 384/471 |

FOREIGN PATENT DOCUMENTS

| | | | |
|---|---|---|---|
| JP | 2004108388 A | | 4/2004 |
| JP | 2008106900 A | * | 5/2008 |
| JP | 2009058091 A | | 3/2009 |

* cited by examiner

*Primary Examiner* — Phillip A Johnson
(74) *Attorney, Agent, or Firm* — Oliff PLC (57) ABSTRACT

A rolling bearing apparatus includes: a bearing portion with an inner ring, an outer ring, balls, and a cage; and a lubrication unit provided adjacently to an annular space formed between the inner ring and the outer ring. The lubrication unit apparatus includes a pump that supplies a lubricant to the annular space and a tank in which a lubricant is stored. The pump has a housing portion filled with the lubricant and a driving portion that drives the lubricant in the housing portion to discharge the lubricant into the annular space. In order to detect insufficiency of the lubricant, the lubrication unit further includes a sensor provided in the pump and having an output that changes according to an amount of the lubricant in the housing portion.

9 Claims, 8 Drawing Sheets

ROLLING BEARING APPARATUS AND LUBRICATION UNIT

INCORPORATION BY REFERENCE

The disclosure of Japanese Patent Application No. 2014-149663 filed on Jul. 23, 2014 including the specification, drawings and abstract, is incorporated herein by reference in its entirety.

BACKGROUND OF THE INVENTION

1. Field of the Invention

The present invention relates to a rolling bearing apparatus with a supply unit that supplies a slight amount of lubricant to a bearing portion and a lubrication unit that supplies a slight amount of lubricant to rotating components such as a rolling bearing.

2. Description of Related Art

Rolling bearings are used as spindle bearings for machine tools. Some rolling bearings adopt oil-air lubrication in order to ensure appropriate lubrication of the rolling bearing (see, for example, Japanese Patent Application Publication No. 2009-58091 (JP 2009-58091 A)). However, the oil-air lubrication involves high running costs due to air consumption and needs incidental facilities such as an oil-air supply apparatus and an air clean unit, possibly leading to high facility costs.

As another means for lubricating a rolling bearing, a bearing apparatus incorporating a lubrication unit is known (see, for example, Japanese Patent Application Publication No. 2004-108388 (JP 2004-108388 A)). In the bearing apparatus, an annular lubrication unit is installed on a fixed bearing ring (fixed ring), of an inner ring and an outer ring, and the rolling bearing and the lubrication unit are integrated together. The lubrication unit includes a tank in which a lubricant is stored and a pump that discharges the lubricant in the tank into an annular space between the inner ring and the outer ring.

A slight amount of lubricant is discharged from the pump. The amount of lubricant discharged is adjusted by controlling operations of the pump. In a bearing apparatus including such a lubrication unit as described above along with a rolling bearing, a slight amount of lubricant can be discharged into the annular space formed between the inner ring and the outer ring. The discharged lubricant adheres to raceway surfaces of the inner and outer rings and to rolling elements, thus allowing the rolling bearing to be lubricated.

In a bearing apparatus with such a lubrication unit as described above, the tank with the lubricant stored therein is stored in a bearing housing along with the rolling bearing. Thus, determining the amount of lubricant remaining in the lubrication unit is not easy.

Consequently, even when all of the lubricant in the lubrication unit including the tank and the pump is consumed and the lubrication unit is empty, this may fail to be noticed and the lubricant adhering to the rolling elements and raceway surfaces may subsequently be lost. As a result, the rolling bearing is used in an unlubricated state, leading to seizure or the like.

SUMMARY OF THE INVENTION

An object of the present invention is to provide a rolling bearing apparatus and a lubrication unit that enable detection of insufficiency of lubricant in the lubrication unit.

A rolling bearing apparatus according to an aspect of the present invention includes: a bearing portion having an inner ring, an outer ring, a plurality of rolling elements interposed between the inner ring and the outer ring, and a cage that holds the rolling elements such that the rolling elements are arranged in a circumferential direction; and a lubrication unit including a pump that supplies a lubricant to an annular space formed between the inner ring and the outer ring and a tank in which the lubricant is stored and which has an outlet portion allowing the lubricant to flow out to the pump. The lubrication unit is provided adjacently to the annular space. In the rolling bearing apparatus, the pump includes a housing portion filled with the lubricant and a driving portion that drives the lubricant in the housing portion to discharge the lubricant into the annular space, the lubrication unit further includes a sensor provided in the pump and having an output that changes according to an amount of the lubricant in the housing portion, in order to detect insufficiency of the lubricant in the lubrication unit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
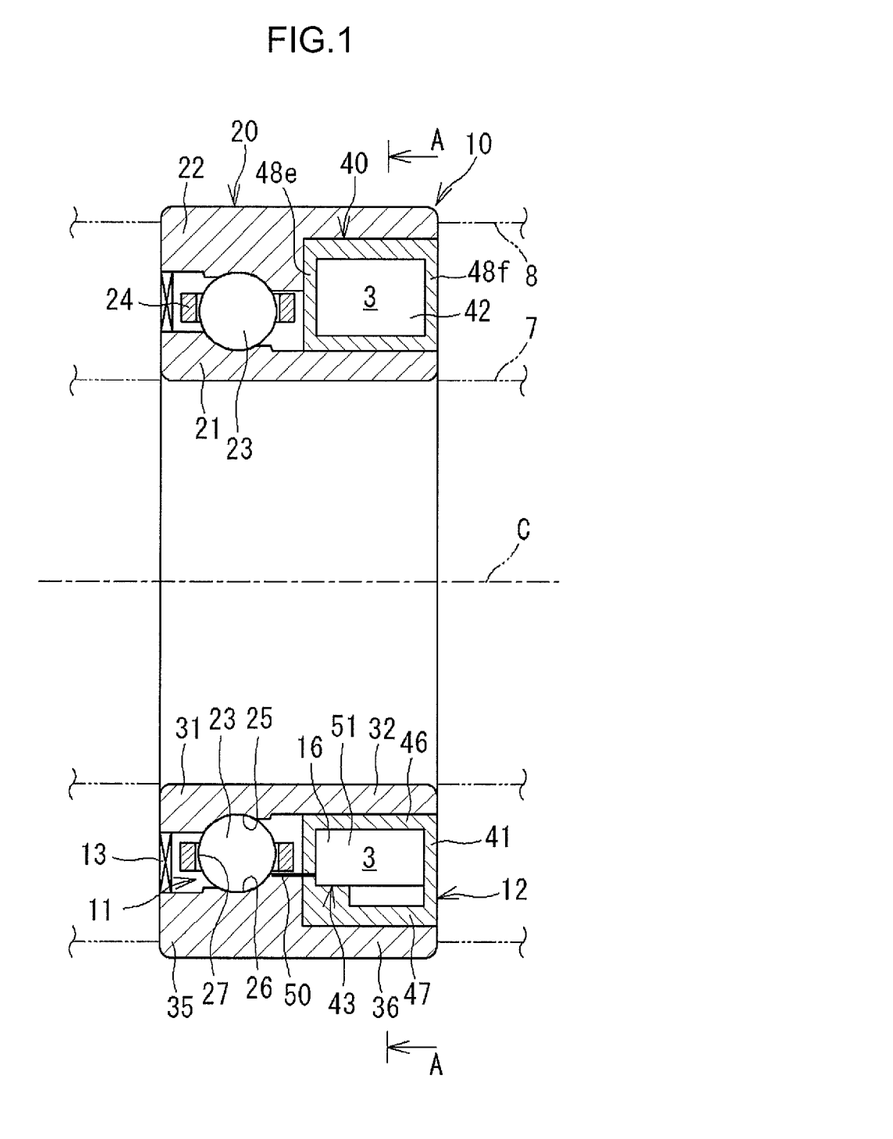
FIG. 1 is a longitudinal sectional view of a rolling bearing apparatus.
Figure 2:
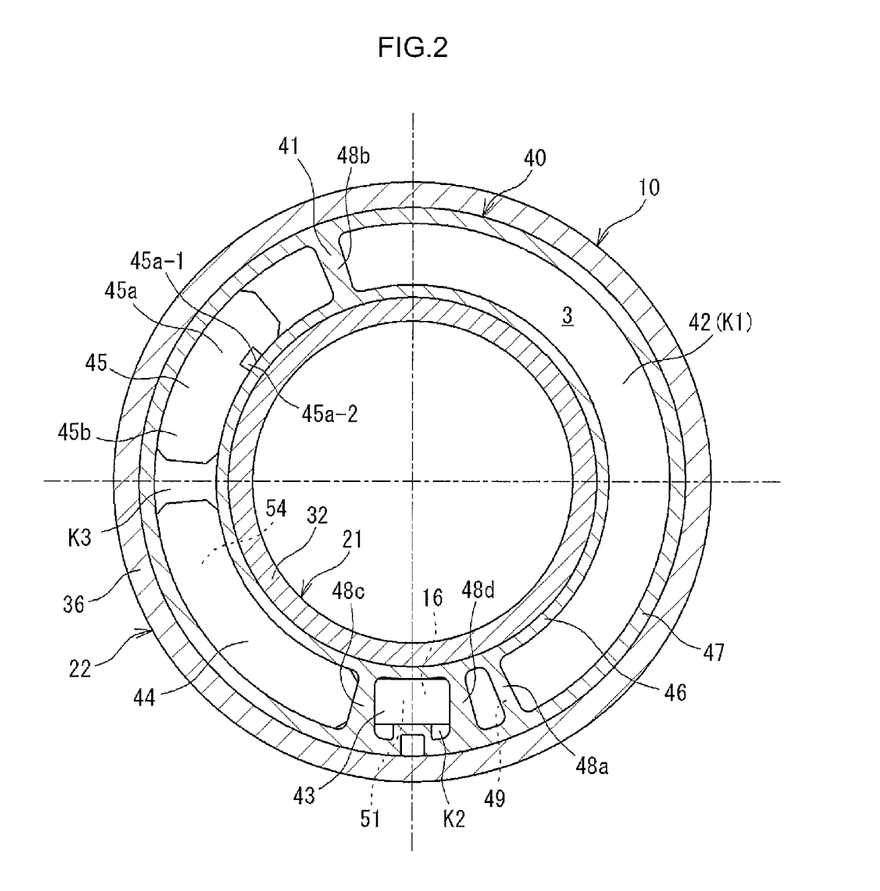
FIG. 2 is a transverse sectional view of the rolling bearing apparatus depicted in FIG. 1.

An embodiment of a rolling bearing apparatus will be described. FIG. 1 is a longitudinal sectional view of a rolling bearing apparatus 10. FIG. 2 is a transverse sectional view of the rolling bearing apparatus 10 depicted in FIG. 1. FIG. 2 is a cross-sectional view taken along line A-A in FIG. 1. As depicted in FIG. 1, the rolling bearing apparatus 10 includes a bearing portion 20 and a lubrication unit 40. The rolling bearing apparatus 10 in the present embodiment is housed in a bearing housing 8 in order to support a spindle (shaft 7) of a machine tool so as to enable rotation of the spindle.

The bearing portion 20 has an inner ring 21, an outer ring 22, a plurality of balls (rolling elements) 23, and a cage 24 that holds the balls 23. The inner ring 21 includes a cylindrical member externally fitted over the shaft 7. The inner ring 21 has an inner ring main body portion 31 on a first side in an axial direction (in FIG. 1, the left side) and an inner ring extension portion 32 on a second side in the axial direction (in FIG. 1, the right side). As a raceway surface, a raceway groove (hereinafter referred to as an inner ring raceway groove 25) is formed on an outer periphery of the inner ring main body portion 31. In the present embodiment, the inner ring main body portion 31 and the inner ring extension portion 32 are integrated together and are indivisible but may be separate from each other. In other words, the inner ring extension portion 32 may be a ring-shaped spacer. The outer ring 22 includes a cylindrical member fixed to an inner peripheral surface of the bearing housing 8. The outer ring 22 has an outer ring main body portion 35 on the first side in the axial direction and an outer ring extension portion 36 on the second side in the axial direction. As a raceway surface, a raceway groove (hereinafter referred to as an outer ring raceway groove 26) is formed on an inner periphery of the outer ring main body portion 35. In the present embodiment, the outer ring main body portion 35 and the outer ring extension portion 36 are integrated together and are indivisible but may be separate from each other. In other words, the outer ring extension portion 36 may be a ring-shaped spacer.

The balls 23 are, interposed between the inner ring main body portion 31 and the outer ring main body portion 35 and roll in the inner ring raceway groove 25 and the outer ring raceway groove 26. The cage 24 includes an annular member and has a plurality of pockets 27 formed along a circumferential direction. The cage 24 has a pair of ring portions and pillar portions that join the ring portions together. In the cage 24, the pockets 27 are each formed between the ring portions and a pair of the pillar portions that are adjacent to each other in the circumferential direction. Each of the balls 23 is housed in a corresponding one of the pockets 27. Thus, the cage 24 can hold the plurality of balls 23 so as to arrange the balls 23 in the circumferential direction. In the present invention, the balls 23 are in contact with the raceway grooves 25 and 26 at a certain contact angle. The bearing portion 20 is an angular ball bearing. When the rolling bearing apparatus 10 is used for a machine tool, the pockets 27 are typically cylindrical.

A first annular space 11 is formed between the inner ring main body portion 31 and the outer ring main body portion 35. A second annular space 12 is formed between the inner ring extension portion 32 and the outer ring extension portion 36. The first annular space 11 and the second annular space 12 are contiguous with each other. A seal member 13 is provided on the first side of the first annular space 11 in the axial direction to prevent a lubricant inside the bearing where the balls 23 and the cage 24 are present from escaping to the exterior of the bearing. Although not depicted in the drawings, a seal member may be provided between the first annular space 11 and the second annular space 12. The seal member may be provided outside the bearing as long as the lubricant inside the bearing can still be prevented from escaping to the exterior.

The balls 23 and the cage 24 are provided in the first annular space 11. The lubrication unit 40 is provided in the second annular space 12. In the present embodiment, the inner ring 21, which is a rotating bearing ring, rotates along with the shaft 7 with respect to the outer ring 22, which serves as a fixed bearing ring. Thus, the lubrication unit 40 is fitted on and attached to an inner peripheral surface of the outer ring extension portion 36 in a close contact manner. In contrast, a very small gap is formed between an outer peripheral surface of the inner ring extension portion 32 and an inner peripheral surface of the lubrication unit 40 (an annular frame 41 described below) to prevent the lubrication unit 40 from hindering rotation of the inner ring 21.

As depicted in FIG. 2, the lubrication unit 40 is generally shaped like a ring. The lubrication unit 40 includes a frame 41, a tank 42, a pump 43, a circuit section 44, and a power supply section 45.

The frame 41 is, for example, an annular member formed of resin and has a short-cylinder-shaped inner peripheral wall 46, a short-cylinder-shaped outer peripheral wall 47, and a plurality of partition walls 48a, 48b, 48c, and 48d provided between the peripheral walls 46 and 47, and sidewalls 48e and 48f (see FIG. 1). The walls define a plurality of spaces K1, K2, and K3 along the circumferential direction.

The first space K1 forms the tank 42. The pump 43 is stored in the second space K2. The circuit section 44 and the power supply section 45 are stored in the third space K3. Thus, the lubrication unit 40 including the frame 41, the tank 42, the pump 43, the circuit section 44, and the power supply section 45 is integrally configured.

The lubrication unit 40 is detachably attached to the outer ring 22 (outer ring extension portion 36), which serves as the fixed bearing ring. The lubrication unit 40 is integrated with the bearing portion 20. As depicted in FIG. 1, the lubrication unit 40 provided in the second annular space 12 is provided adjacently to the first annular space 11 in the axial direction.

The tank 42 is intended to store a lubricant 3. In the present embodiment, as depicted in FIG. 2, the tank 42 is a space defined by a part of the inner peripheral wall 46, a part of the outer peripheral wall 47, the partition wall 48a, the partition wall 48b, and the sidewalls 48e and 48f (see FIG. 1). The tank 42 has, in a part thereof, an outlet portion (outlet port) 49 through which the stored lubricant 3 flows out to the pump 43. The outlet portion 49 and the pump 43 (a housing portion 51 described below) are joined together through a channel. In the tank 42, a holding element (for example, a felt or a sponge) may be provided which holds the lubricant 3 The lubricant 3 in the present embodiment is oil, but may be grease.

The power supply section 45 has a power generating section 45a and a secondary battery section 45b. The power generating section 45a is configured such that rotation of the inner ring 21 enables the power generating section 45a to generate power. In other words, a rotor 45a-1 is provided on an outer periphery of the inner ring extension portion 32. The power generating section 45a has a stator 45a-2 provided on an inner periphery of the frame 41. The rotor 45a-1 is magnetized so as to alternately provide N poles and S poles along the circumferential direction. The stator 45a-2 is formed of a magnetic material and is provided such that the rotor 45a-1 passes through a radially inner side of the stator 45a-2. Power generated by the power generating section 45a is stored in the secondary battery section 45b.

The circuit section 44 includes a circuit board including a programmed microcomputer and transmits control signals (driving signals) to the pump 43. In other words, the circuit section 44 provides driving power (applies a predetermined voltage) to the pump 43. The circuit section 44 has a function to execute various processes besides the function to drive the pump 43 (driving control section). For example, the circuit section 44 can acquire a signal from a sensor 16 provided in the lubrication unit 40. The circuit section 44 has a function to serve as a detection section 54 that detects insufficiency of the lubricant 3 in the lubrication unit 40 based on the signal. The detection section 54 can be implemented by the function of the programmed microcomputer.

Figure 3:
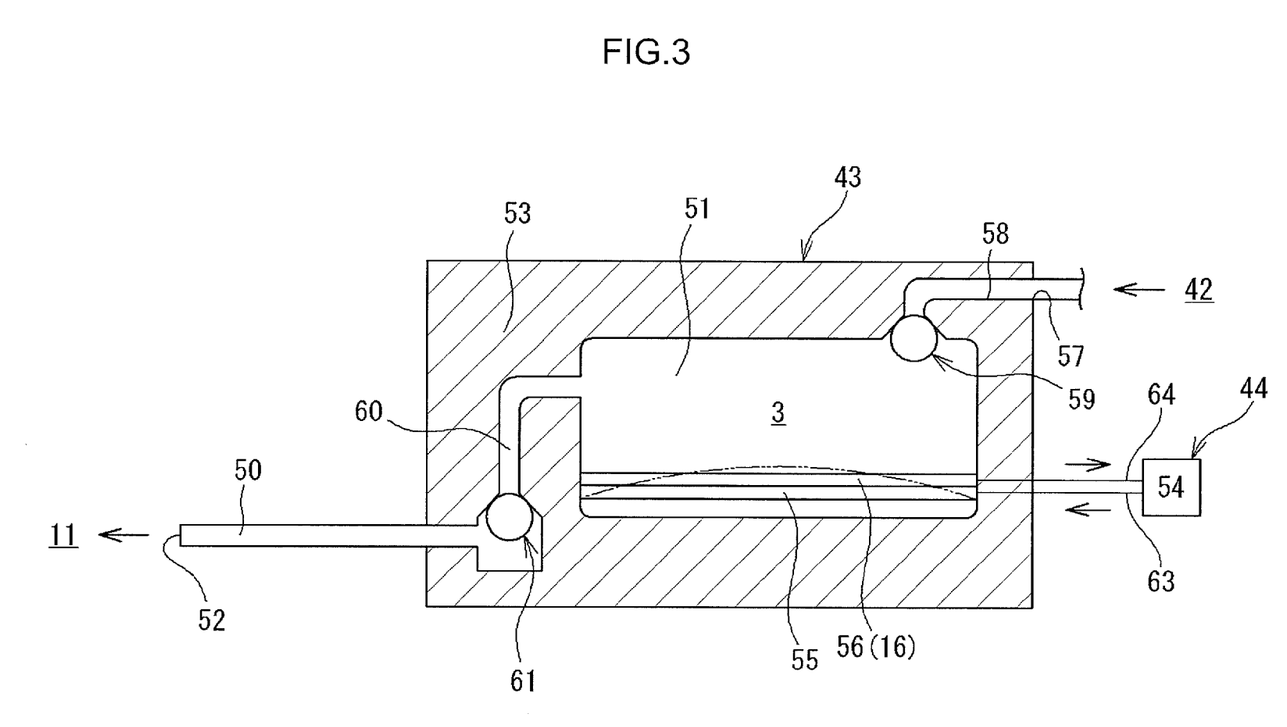
FIG. 3 is a sectional view illustrating a pump.

FIG. 3 is a sectional view illustrating the pump 43. The pump 43 includes a small pump (micro pump) and is attached to a part (lower part) of the frame 41 (see FIG. 2). As depicted in FIG. 3, the pump 43 includes a case 53, a nozzle 50, the housing portion 51, and a piezoelectric element 55. The nozzle 50 is provided so as to extend from the case 53. The housing portion 51 stores the lubricant 3.

The piezoelectric element 55 is used to discharge the lubricant. In the present embodiment, besides the piezoelectric element 55 for discharge (first piezoelectric element), a second piezoelectric element 56 used as the sensor 16 is provided which will be described below.

The pump 43 has an upstream side channel 58 and a first check valve 59. The upstream side channel 58 joins the housing portion 51 to an inlet port 57 through which the lubricant 3 having flowed from the tank 42 flows into the pump 43. The first check valve 59 prevents the lubricant 3 in the housing portion 51 from flowing back toward the tank 42 side. The pump 43 further has a downstream side channel 60 and a second check valve 61. The downstream side channel 60 connects the housing portion 51 and the nozzle 50 together. The second check valve 61 is provided in the middle of the downstream side channel 60 to prevent the lubricant 3 from flowing back from the nozzle 50 to the housing portion 51.

The housing portion 51 includes a space formed in the case 53. The housing portion 51 is filled with the lubricant 3. The pump 43 has the first piezoelectric element 55 as a driving portion that drives the lubricant 3 in the housing portion 51 to discharge the lubricant 3 into the first annular space 11.

The first piezoelectric element 55 is shaped like a plate and provides a part of an inner wall of the housing portion 51. When a voltage is applied to the first piezoelectric element 55, the first piezoelectric element 55 is deformed (displaced), and the deformation causes a reduction in the volume of the housing portion 51 to discharge the lubricant 3 in a full state in the housing portion 51, into the first annular space 11 through the nozzle 50. The deformed first piezoelectric element 55 is depicted by a long dashed double-short dashed line in FIG. 3. To facilitate the understanding, the deformed state is shown in an exaggerated manner compared to the reality. The full state of the lubricant 3 in the housing portion 51 refers to a state where the housing portion 51 is full of the lubricant 3 and where, when the first piezoelectric element 55 is deformed to reduce the volume of the housing portion 51, the internal pressure of the lubricant 3 in the housing portion 51 significantly rises. Then, when the first piezoelectric element 55 recovers the original shape, the first check valve 59 is opened to allow the lubricant 3 in the tank 42 to be sucked into the housing portion 51.

Application of a voltage to the first piezoelectric element 55 and a timing for the application of the voltage are controlled by the circuit section 44 (see FIG. 2). The power applied to the first piezoelectric element 55 is supplied by the power supply section 45 (secondary battery section 45b). A pulsed voltage is applied to the first piezoelectric element 55 to allow the lubricant 3 to be intermittently discharged. A slight amount of discharge can be achieved by controlling the number of pulses and the value of the voltage applied to the first piezoelectric element 55.

The pump 43 is driven as described above to discharge the lubricant 3 in the pump (housing portion 51) to the exterior of the pump through the nozzle 50. The nozzle 50 is shaped like a needle and has a discharge port 52 at a tip of the nozzle 50. The discharge port 52 is open at the tip (tip surface) of the nozzle 50, and through the discharge port 52, the lubricant 3 is discharged toward the outer ring raceway groove 26 of the outer ring 22 (see FIG. 1), which serves as the fixed bearing ring. A longitudinal direction of the nozzle 50 is present on a plane containing a center line of the rolling bearing apparatus 10. The nozzle 50 may be formed to extend through a space between an inner peripheral surface of the cage 24 and an outer peripheral surface of the inner ring 21 to discharge the lubricant to an inner ring-side part of each of the balls 23.

Now, the amount of the lubricant 3 discharged by the pump 43 will be described. When the pump 43 receives the driving signal (control signal) from the circuit section 44, the first piezoelectric element 55 is driven to discharge the lubricant 3 through the nozzle 50 in the form of droplets. A constant amount (appropriately constant amount) of droplets of the lubricant 3 are discharged by a single driving operation of the pump 43 (first piezoelectric element 55). The amount (volume) of droplets discharged per driving operation (shot) of the pump 43 may be five picoliters to seven microliters or may be set to one nanoliter to 1,000 nanoliters or five picoliters to 1,000 picoliters. The frequency of this lubrication (time intervals between shots) may be every several seconds, every several minutes, or every several hours. As described above, the pump 43 allows the lubricant 3 to be intermittently supplied (at regular time intervals) to the first annular space 11 (see FIG. 1) formed between the inner ring 21 and the outer ring 22. The rolling bearing apparatus 10 with the lubrication unit 40 as described above enables a slight amount of the lubricant 3 to be supplied to the bearing portion 20 and is also referred to as a nano-lubrication bearing.

The lubrication unit 40 in the present embodiment has a function to control the insufficiency of the lubricant 3 supplied to the first annular space 11. That is, the lubrication unit 40 includes the sensor 16 in order to detect the insufficiency of the lubricant 3 in the lubrication unit 40. The sensor 16 is not provided in the tank 42 in which the lubricant 3 is stored but in the pump 43.

The sensor 16 in the embodiment depicted in FIG. 3 is a second piezoelectric element 56 shaped like a plate and provided so as to overlap the first piezoelectric element 55. In the present embodiment, the plate-shaped first piezoelectric element 55 itself forms a part of the inner wall of the housing portion 51. However, although not depicted in the drawings, an elastically deformable thin film (diaphragm) may alternatively form a part of the inner wall of the housing portion 51. In this case, the first piezoelectric element 55 is attached to one surface of the thin film. Moreover, the second piezoelectric element 56 functioning as the sensor 16 may be attached to the other surface of the thin film. In other words, the second piezoelectric element 56 may be provided so as to overlap the first piezoelectric element 55 via the thin film.

The first piezoelectric element 55 and the second piezoelectric element 56 may be adhesively fixed together but may be laminated together without using an adhesive. When no adhesive is used, the second piezoelectric element 56 is preferably provided closer to the housing portion 51 than the first piezoelectric element 55, which is deformed so as to protrude toward the housing portion 51 side as depicted in FIG. 3. This is because, if the second piezoelectric element 56 is located at the opposite position, even when the first piezoelectric element 55 is deformed so as to protrude toward the housing portion 51 side, the second piezoelectric element 56 may fail to follow the deformation of the first piezoelectric element 55 in the case of no adhesive.

Figure 4A:
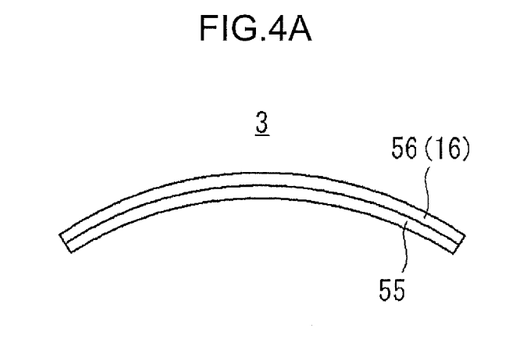
FIGS. 4A and 4B are diagrams illustrating functions of a sensor depicted in FIG. 3.
Figure 4B:
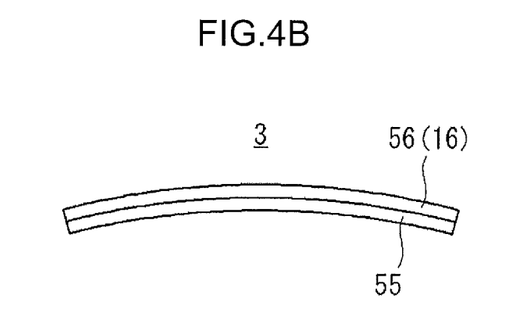

As depicted in FIG. 3, an input wire 63 extending from the circuit section 44 is joined to the first piezoelectric element 55. An output wire 64 extending from the circuit section 44 is joined to the second piezoelectric element 56. Electricity (current) that allows the first piezoelectric element 55 to be deformed flows through the input wire 63. Electricity (current) output by the second piezoelectric element 56 as a result of the deformation of the second piezoelectric element 56 flows through the output wire 64. As depicted in FIG. 3, the second piezoelectric element 56 is provided, in a laminated manner, on the first piezoelectric element 55, which is deformed by application of a voltage to the second piezoelectric element 56. Thus, the second piezoelectric element 56 is deformed according to the deformation of the first piezoelectric element 55. In other words, as depicted in FIG. 4A, when the first piezoelectric element 55 is significantly deformed, the second piezoelectric element 56 follows the deformation and is thus also significantly deformed. As depicted in FIG. 4B, when the first piezoelectric element 55 is insignificantly deformed, the second piezoelectric element 56 follows the deformation and is thus also insignificantly deformed.

Functions of the second piezoelectric element 56 will be described. In the full state where the housing portion 51 of the pump 43 is full of the lubricant 3 and in a non-full state where the amount of the lubricant 3 has decreased compared to the amount in the full state, the same driving voltage is applied to the first piezoelectric element 55 in order to allow the pump 43 to discharge the lubricant 3, and the results of the application are compared between the full state and the non-full state. Then, resistance from the lubricant 3 in the non-full state is lower than in the full state, allowing the first piezoelectric element 55 to be more significantly deformed in the non-full state. This is because, when the amount of the lubricant 3 in the housing portion 51 deceases, air mixes into the housing portion 51 to affect changes in the internal pressure of the housing portion 51. Thus, in the configuration depicted in FIG. 3, a change in the amount of deformation of the first piezoelectric element 55 appears as a change in the amount of deformation of the second piezoelectric element 56. Consequently, detecting (observing) a change in an output from the second piezoelectric element 56 enables the insufficiency of the lubricant 3 in the housing portion 51 of the pump 43 to be detected.

Specifically, the detection section 54 of the circuit section 44 measures, from moment to moment, one of a current value, a voltage value, and a resistance value received by the circuit section 44 through the output wire 64 from the second piezoelectric element 56 having been deformed according to the amount of deformation of the first piezoelectric element 55. When a pulsed voltage is applied to the first piezoelectric element 55, the volume of the housing portion 51 decreases at the same time intervals as the time intervals (periods) of the pulse. When the housing portion 51 is full of the lubricant 3, the resistance from the lubricant 3 to the deformed first piezoelectric element 55 is constant, and the amount of deformation of the first piezoelectric element 55 is constant. Thus, the amount of deformation of the second piezoelectric element 56 is constant, and a signal output by the second piezoelectric element 56 has a constant value. In contrast, when the housing portion 51 is in the non-full state, the resistance from the lubricant 3 to the deformed first piezoelectric element 55 is lower than that in the full state, and the amount of deformation of the first piezoelectric element 55 is larger than that in the full state. Consequently, the amount of deformation of the second piezoelectric element 56 is larger than that in the full state, and the signal output from the second piezoelectric element 56 changes compared to the signal in the full state (for example, the current value increases). In other words, FIG. 4B depicts a deformed state of the piezoelectric elements 55 and 56 in the full state, and FIG. 4A depicts a deformed state of the piezoelectric elements 55 and 56 in the non-full state.

Thus, the detection section 54 of the circuit section 44 measures the signal output from the second piezoelectric element 56, and outputs a detection signal when the signal with the constant value significantly changes such that the value exceeds a predetermined threshold. In other words, the detection signal is a signal indicating that the housing portion 51 of the pump 43 has changed from the full state to the non-full state. The detection signal is output wirelessly (or in a wired manner) from the circuit section 44 to the exterior of the rolling bearing apparatus 10. In the present embodiment, the output detection signal can be received by a control apparatus for the machine tool. Upon acquiring the detection signal, the control apparatus outputs information indicating that the lubricant 3 in the rolling bearing apparatus 10 is likely to be insufficient, to an operator (manager). For example, the relevant information is output to a monitor of the control apparatus. Upon viewing this, the operator can perform maintenance work on the rolling bearing apparatus 10.

As described above, the lubrication unit 40 includes the second piezoelectric element 56 as the sensor 16 in order to detect the insufficiency of the lubricant 3. The second piezoelectric element 56 is configured such that the output from the second piezoelectric element 56 changes according to the amount of the lubricant 3 in the housing portion 51 of the pump 43. Thus, the detection section 54 detects (observes) a change in the output from the second piezoelectric element 56 to enable the insufficiency (deficiency) of the lubricant 3 in the housing portion 51 of the pump 43 to be detected.

Figure 5:
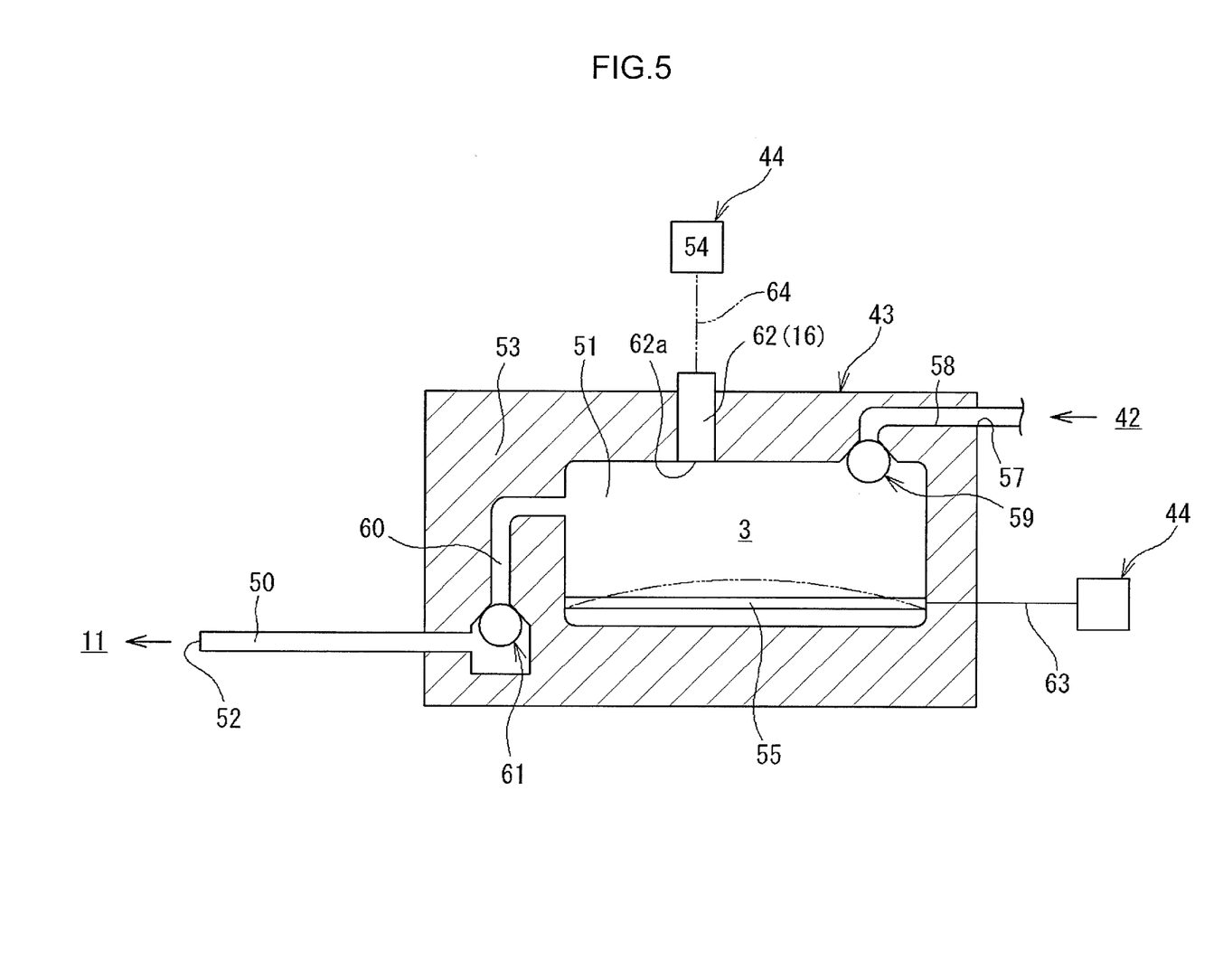
FIG. 5 is a diagram illustrating the pump for description of another form (1) of the sensor.

FIG. 5 is a diagram illustrating the pump 43 for description of another form of the sensor 16. The form depicted in FIG. 5 is the same as the form depicted in FIG. 3 except for the sensor 16. The same points are as described above and will not be described below.

The sensor 16 in the embodiment depicted in FIG. 5 is a pressure sensor 62. The pressure sensor 62 is attached to the case 53 and includes a sensing section 62a that senses pressure and that is exposed to the housing portion 51. This enables the pressure sensor 62 to detect the internal pressure of the lubricant 3 in the housing portion 51. The output wire 64 extending from the circuit section 44 is joined to the pressure sensor 62. A signal according to a pressure detected by the pressure sensor 62 is input to the circuit section 44 through the output wire 64.

Figure 6A:
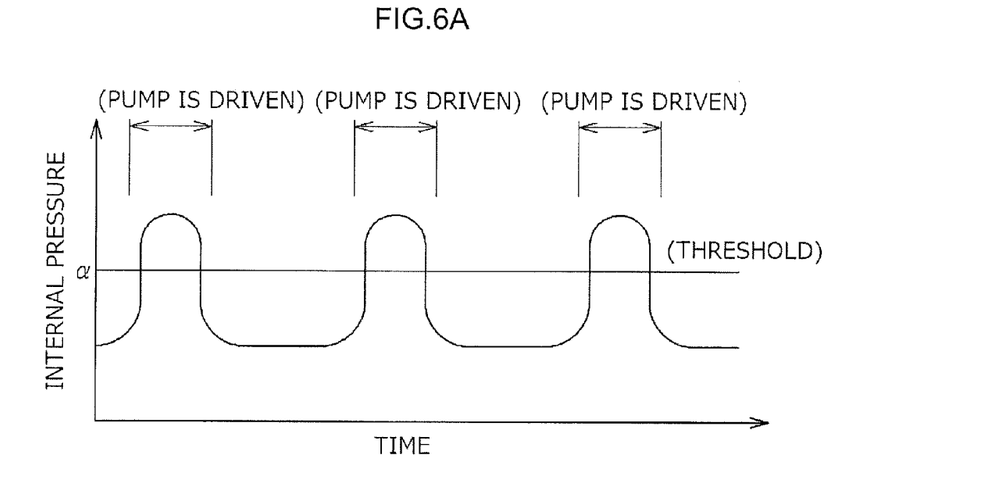
FIGS. 6A and 6B are diagrams illustrating functions of a sensor depicted in FIG. 5.
Figure 6B:
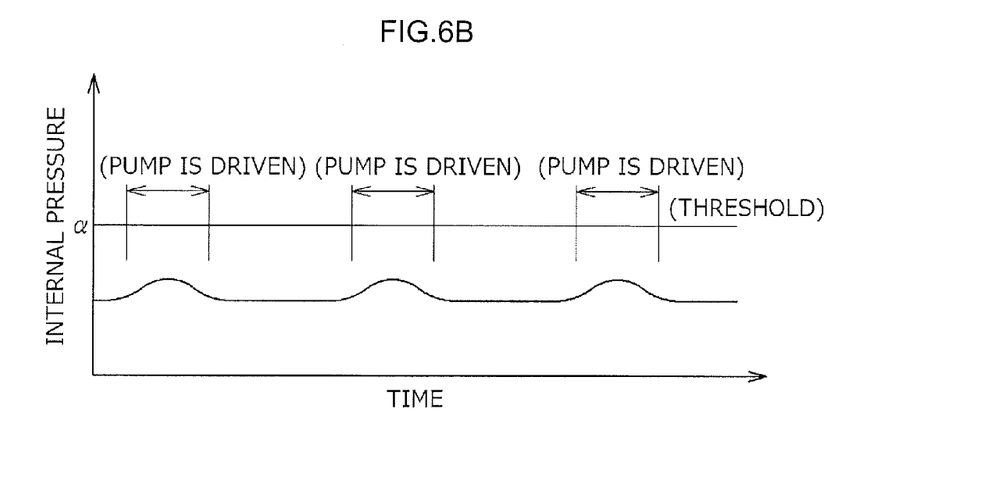

Functions of the pressure sensor 62 depicted in FIG. 5 will be described below. In the full state, the housing portion 51 is full of the lubricant 3. Then, when the pump 43 is driven, in other words, when the first piezoelectric element 55 is deformed to reduce the volume of the housing portion 51 in order to discharge the lubricant 3, the internal pressure of the housing portion 51 rises, during the reduction in volume, to reach a predetermined value as depicted in FIG. 6A. In FIGS. 6A and 6B, a pulsed voltage is applied to the first piezoelectric element 55 to intermittently deform the first piezoelectric element 55. However, once the lubricant 3 in the housing portion 51 decreases to change the full state into the non-full state, even when the first piezoelectric element 55 is deformed to reduce the volume of the housing portion 51, the internal pressure of the housing portion 51 during the reduction in volume is lower than that in the full state as depicted in FIG. 6B. In other words, in the non-full state, the internal pressure does not substantially increase.

Thus, in the embodiment depicted in FIG. 5, the pressure sensor 62 provided in the housing portion 51 detects the internal pressure of the lubricant 3 to detect (observe) a change in internal pressure as a change in an output from the pressure sensor 62. This enables the insufficiency of the lubricant 3 in the housing portion 51 of the pump 43 to be detected.

Specifically, the detection section 54 of the circuit section 44 measures, from moment to moment, a detection signal received by the circuit section 44 from the pressure sensor 62 through the output wire 64. When the housing portion 51 is full of the lubricant 3, the signal output from the pressure sensor 62 represents a value exceeding a threshold a (constant value) in synchronization with the provision of the driving signal to the first piezoelectric element 55. In contrast, when the housing portion 51 is in the non-full state, the value of the signal output from the pressure sensor 62 may slightly rise in synchronization with the provision of the driving signal to the first piezoelectric element 55, but does not exceed the threshold a.

The detection section 54 of the circuit section 44 measures the signal output by the pressure sensor 62. Thus, when the internal pressure that is to rise (the level of the signal from the pressure sensor 62) has not been obtained, in other words, the internal pressure (signal level) is low and fails to exceed the threshold a, the detection section 54 outputs a detection signal. The detection signal is a signal indicating that the housing portion 51 of the pump 43 has changed from the full state to the non-full state. The detection signal is output wirelessly (or in a wired manner) from the circuit section 44 to the exterior of the rolling bearing apparatus 10. In the present embodiment, the output detection signal can be received by the control apparatus for the machine tool. Upon acquiring the detection signal, the control apparatus outputs information indicating that the lubricant 3 in the rolling bearing apparatus 10 is likely to be insufficient, to the operator. For example, the relevant information is output to the monitor of the control apparatus. Upon viewing this, the operator can perform maintenance work on the rolling bearing apparatus 10.

As described above, the lubrication unit 40 includes the pressure sensor 62 as the sensor 16 in order to detect the insufficiency of the lubricant 3. The pressure sensor 62 is configured such that the output from the pressure sensor 62 changes according to the amount of the lubricant 3 in the housing portion 51 of the pump 43. Thus, the detection section 54 detects (observes) a change in the output from the pressure sensor 62 to enable the insufficiency (deficiency) of the lubricant 3 in the housing portion 51 of the pump 43 to be detected.

Figure 7:
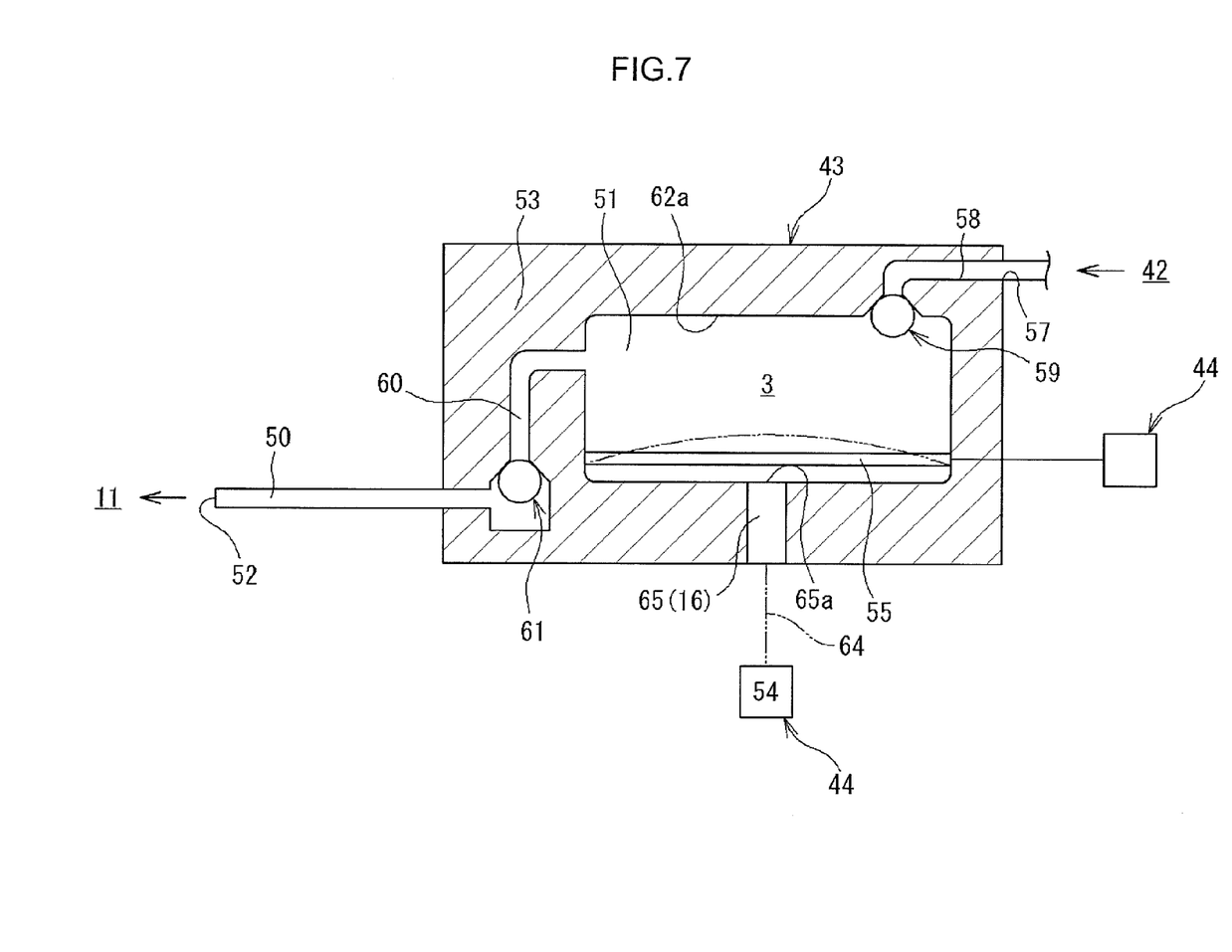
FIG. 7 is a diagram illustrating the pump for description of another form (2) of the sensor.

FIG. 7 is a diagram illustrating the pump 43 for description of another form of the sensor 16. The form depicted in FIG. 7 is the same as the forms depicted in FIG. 3 and FIG. 5 except for the sensor 16. The same points are as described above and will not be described below.

The sensor 16 in the embodiment depicted in FIG. 7 is a displacement sensor 65 that detects the amount of deformation of the first piezoelectric element 55. The displacement sensor 65 is attached to the case 53 and configured such that a sensing section 65a that senses displacement of an object faces a part of the first piezoelectric element 55. When a surface of the first piezoelectric element 55 on the housing portion 51 side is defined as a front surface, the displacement sensor 65 detects displacement of a back surface of the first piezoelectric element 55. The displacement sensor 65 in the present embodiment is a gap sensor (non-contact displacement sensor) and detects a value for a gap between the displacement sensor 65 and the first piezoelectric element 55. The output wire 64 extending from the circuit section 44 is joined to the displacement sensor 65. A signal according to displacement detected by the displacement sensor is input to the circuit section 44 through the output wire 64.

Functions of the displacement sensor 65 will be described. In the full state where the housing portion 51 of the pump 43 is full of the lubricant 3 and in the non-full state where the amount of the lubricant 3 has decreased compared to the amount in the full state, the same driving voltage is applied to the first piezoelectric element 55 in order to allow the pump 43 to discharge the lubricant 3, and the results of the application are compared between the full state and the non-full state. Then, the resistance from the lubricant 3 in the non-full state is lower than that in the full state, allowing the first piezoelectric element 55 to be more significantly deformed in the non-full state. This is because, when the amount of the lubricant 3 in the housing portion 51 deceases, air mixes into the housing portion 51 to affect changes in the internal pressure of the housing portion 51.

Figure 8A:
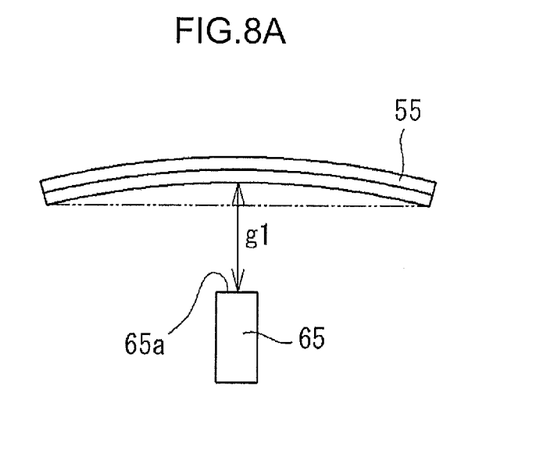
FIGS. 8A and 8B are diagrams illustrating functions of a sensor depicted in FIG. 7.
Figure 8B:
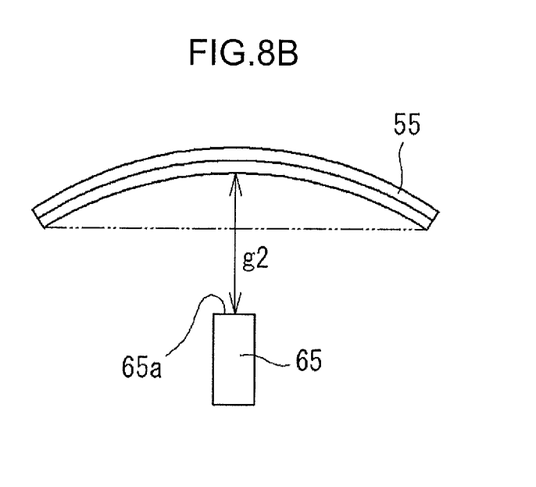

Thus, the detection section 54 of the circuit section 44 measures, from moment to moment, a detection signal received by the circuit section 44 from the displacement sensor 65 through the output wire 64. As depicted in FIG. 8A, the amount of deformation of the first piezoelectric element 55 is small in the full state. The displacement sensor 65 detects a gap g1 between the displacement sensor 65 and the first piezoelectric element 55 in synchronization with the provision of the driving signal to the first piezoelectric element 55. When the full state changes to the non-full state, the amount of deformation of the first piezoelectric element 55 becomes larger than that in the full state as depicted in FIG. 8B. Consequently, the displacement sensor 65 detects a gap g2 that is larger than the gap g1 in the full state (g1<g2) in synchronization with the provision of the driving signal to the first piezoelectric element 55.

As described above, the configuration depicted in FIG. 7 allows the detection section 54 to detect (observe) a change in the amount of deformation of the first piezoelectric element 55, in other words, a change in the gap between the displacement sensor 65 and the first piezoelectric element 55, based on the detection value from the displacement sensor 65. Upon detecting a change in the gap, the detection section 54 outputs a detection signal. The detection signal is a signal indicating that the housing portion 51 of the pump 43 has changed from the full state to the non-full state. The detection signal is output wirelessly (or in a wired manner) from the circuit section 44 to the exterior of the rolling bearing apparatus 10. In the present embodiment, the output detection signal can be received by the control apparatus for the machine tool. Upon acquiring the detection signal, the control apparatus outputs information indicating that the lubricant 3 in the rolling bearing apparatus 10 is likely to be insufficient, to the operator. For example, the relevant information is output to the monitor of the control apparatus. Upon viewing this, the operator can perform maintenance work on the rolling bearing apparatus 10.

As described above, the lubrication unit 40 includes the displacement sensor 65 as the sensor 16 in order to detect the insufficiency of the lubricant 3. The displacement sensor 65 is configured to have an output that changes according to the amount of the lubricant 3 in the housing portion 51 of the pump 43. Thus, detecting (observing) a change in the output from the displacement sensor 65 enables the insufficiency (deficiency) of the lubricant 3 in the housing portion 51 of the pump 43 to be detected.

The sensors 16 in the respective forms depicted in FIG. 3, FIG. 5, and FIG. 7 will be described.

As described above, in each of the above-described embodiments, the sensor 16 is provided to detect the insufficiency of the lubricant 3 in the lubrication unit 40. The sensor 16 is configured to have an output that changes according to the amount of the lubricant 3 in the housing portion 51 of the pump 43. Thus, detecting (observing) a change in the output from the sensor 16 enables the insufficiency (deficiency) of the lubricant 3 in the housing portion 51 of the pump 43 to be detected. Furthermore, the lubrication unit 40 further includes the detection section 54 that acquires the output signal from the sensor 16 to detect a change in the output signal. Thus, the lubrication unit 40 itself can detect the insufficiency of the lubricant 3 in the housing portion 51 of the pump 43. Upon detecting the insufficiency of the lubricant 3, the detection section 54 can output information indicative of the insufficiency to inform the operator of the insufficiency of the lubricant.

As a result, the bearing portion 20 can be prevented from being used in an unlubricated state.

In the embodiment depicted in FIG. 3, the sensor 16 that detects the insufficiency of the lubricant 3 is the second piezoelectric element 56 provided so as to overlap the first piezoelectric element 55 for driving. This eliminates the need for additional processing performed on the case 53 in order to install the pressure sensor 62 depicted in FIG. 5 or the displacement sensor 65 depicted in FIG. 7, simplifying the configuration.

In the above-described embodiments, in order to detect the insufficiency of the lubricant 3 in the lubrication unit 40 with the tank 42 and the pump 43, the sensor 16 is not provided in the tank 42 but in the pump 43. The reason for this is as follows. The pump 43 of the lubrication unit 40 supplies a slight amount of the lubricant 3 to the first annular space 11. Thus, the pump 43 intermittently (in other words, at regular time intervals) supplies the lubricant 3 in the form of droplets, with the result that a slight amount of the lubricant 3 is discharged to the first annular space 11 per unit time. Consequently, even when the tank 42 of the lubrication unit 40 is empty, as long as the lubricant 3 remains in a channel that joins the tank 42 and the pump 43 together, a channel 58 on an upstream side of the pump 43, and the like, the remaining lubricant 3 is discharged through the pump 43 to enable the lubrication unit 40 to function for a while. Thus, as described above, the sensor 16 that detects the insufficiency of the lubricant 3 is provided in the pump 43. Accordingly, the following operation is possible. Even with a decrease in the amount of the lubricant 3 in the tank 42, the insufficiency remains undetected by the sensor 16, and the sensor 16 detects the insufficiency for the first time when the amount of the lubricant 3 remaining in the housing portion 51 of the pump 43 decreases.

Another application example (1) is illustrated below. In the above-described embodiments, the case has been described where the rotating bearing ring is the inner ring 21 while the fixed bearing ring is the outer ring 22. However, it is also preferable that the rotating bearing ring be the outer ring 22 while the fixed bearing ring be the inner ring 21. Moreover, although not depicted in the drawings, the rolling bearing apparatus 10 may further include, in the frame 41, various sensors that detect temperature, vibration, an oil film condition on the raceway surface, and the like so that the circuit section 44 can determine (change) driving conditions (the amount of lubricant discharged by a single operation and discharge intervals) for the pump 43 based on detection signals from the sensors.

Another application example (2) is illustrated below. In the above-described embodiments, the lubrication unit 40 is integrated with the bearing portion 20 to provide the rolling bearing apparatus 10. However, the lubrication unit 40 may be used with another component or the like. For example, the lubrication unit 40 may be combined with a rotating component such as a one-way clutch or a ball screw. In this case, the lubrication unit 40 is provided adjacently to a lubrication-needed area of the rotating component to supply the lubricant to the lubrication-needed area. The lubrication unit 40 includes the tank 42 and the pump 43 as is the case with the above-described embodiments. The tank 42 stores the lubricant 3. The pump 43 supplies the lubricant 3 to the lubrication-needed area. The pump 43 has the housing portion 51 and a driving portion (first piezoelectric element 55). The housing portion 51 is filled with the lubricant 3. The driving portion (first piezoelectric element 55) drives the lubricant 3 in the housing portion 51 to discharge the lubricant 3 to the lubrication-needed area. The lubrication unit 40 further includes the sensor 16 provided in the housing portion 51 and having an output that changes according to the amount of the lubricant 3 in the housing portion 51.

The rolling bearing apparatus 10 and the lubrication unit 40 in the present invention are not limited to the illustrated forms but may be in any other form within the scope of the present invention. For example, in the above-described embodiments, the case has been described where the lubrication unit 40 includes the power supply section 45 in the frame 41. However, the power supply section 45 may be provided outside the frame 41. In this case, the circuit section 44 (pump 43) in the frame 41 and the external power supply section 45 are connected together through a cable.

Furthermore, in the above-described embodiments of the rolling bearing apparatus 10, the bearing portion 20 is a ball bearing. However, the bearing portion 20 may be a roller bearing.

The rolling bearing apparatus according to the present invention enables the insufficiency of the lubricant remaining in the lubrication unit to be detected, allowing the bearing portion to be prevented from being used in the unlubricated state.

The lubrication unit according to the present invention enables the insufficiency of the lubricant remaining in the lubrication unit to be detected, allowing the rotating component to be prevented from being used in the unlubricated state.

What is claimed is:
1. A rolling bearing apparatus comprising:
a bearing portion including an inner ring, an outer ring, a plurality of rolling elements interposed between the inner ring and the outer ring, and a cage that holds the rolling elements such that the rolling elements are arranged in a circumferential direction; and
a lubrication unit including a pump that supplies a lubricant to an annular space formed between the inner ring and the outer ring and a tank in which the lubricant is stored and which includes an outlet portion allowing the lubricant to flow out to the pump, the lubrication unit being provided adjacently to the annular space, wherein
the pump includes a housing portion filled with the lubricant and a driving portion that drives the lubricant in the housing portion to discharge the lubricant into the annular space, and
the lubrication unit further includes a sensor provided in the pump and having an output that changes according to an amount of the lubricant in the housing portion, in order to detect insufficiency of the lubricant in the lubrication unit.

2. The rolling bearing apparatus according to claim 1, wherein the lubrication unit further includes a detection section that acquires an output signal from the sensor and detects a change in the output signal.

3. The rolling bearing apparatus according to claim 2, wherein the pump includes, as the driving portion, a first piezoelectric element that is deformed to reduce a volume of the housing portion to discharge the lubricant in the housing portion into the annular space, and the sensor is a second piezoelectric element provided so as to overlap the first piezoelectric element and deformed according to deformation of the first piezoelectric element.

4. The rolling bearing apparatus according to claim 2, wherein the sensor is a pressure sensor that detects an internal pressure of the lubricant in the housing portion.

5. The rolling bearing apparatus according to claim 2, wherein the pump includes, as the driving portion, a piezoelectric element that is deformed to reduce a volume of the housing portion to discharge the lubricant in the housing portion into the annular space, and the sensor is a displacement sensor that detects an amount of deformation of the piezoelectric element.

6. The rolling bearing apparatus according to claim 1, wherein the pump includes, as the driving portion, a first piezoelectric element that is deformed to reduce a volume of the housing portion to discharge the lubricant in the housing portion into the annular space, and the sensor is a second piezoelectric element provided so as to overlap the first piezoelectric element and deformed according to deformation of the first piezoelectric element.

7. The rolling bearing apparatus according to claim 1, wherein the sensor is a pressure sensor that detects an internal pressure of the lubricant in the housing portion.

8. The rolling bearing apparatus according to claim 1, wherein the pump includes, as the driving portion, a piezoelectric element that is deformed to reduce a volume of the housing portion to discharge the lubricant in the housing portion into the annular space, and the sensor is a displacement sensor that detects an amount of deformation of the piezoelectric element.

9. A lubrication unit comprising:

a pump that supplies a lubricant to a lubrication-needed area of a rotating component; and a tank in which the lubricant is stored and which includes an outlet portion that allows the lubricant to flow out to the pump, the lubrication unit being provided adjacently to the lubrication-needed area, wherein the pump includes:

a housing portion filled with the lubricant; and a driving portion that drives the lubricant in the housing portion to discharge the lubricant to the lubrication-needed area, and the lubrication unit further includes a sensor provided in the pump and having an output that changes according to an amount of the lubricant in the housing portion, in order to detect insufficiency of the lubricant.

* * * * *